United States Patent [19]

Hanks

[11] Patent Number: 4,731,762
[45] Date of Patent: Mar. 15, 1988

[54] DISTANCE SENSING APPARATUS

[75] Inventor: Paul Hanks, Malmesbury, England

[73] Assignee: Fisco Electronics, Rayleigh, England

[21] Appl. No.: 754,641

[22] Filed: Jul. 12, 1985

[30] Foreign Application Priority Data

Jul. 17, 1984 [GB] United Kingdom ................ 8418213

[51] Int. Cl.⁴ .............................................. G01S 9/68
[52] U.S. Cl. ...................................... 367/108; 367/99;
367/112; 367/95
[58] Field of Search ................... 367/99, 97, 108, 112,
367/107, 95; 356/5; 342/135

[56] References Cited

U.S. PATENT DOCUMENTS

| | | | |
|---|---|---|---|
| 3,454,922 | 7/1969 | Dory | 367/97 |
| 3,545,861 | 4/1966 | Farnsworth et al. | 356/5 |
| 3,743,419 | 7/1973 | Skagerlund | 356/5 |
| 3,942,149 | 3/1976 | Westfall, Jr. | 367/108 |
| 4,122,428 | 10/1978 | Morrow, Jr. | 367/108 |
| 4,386,409 | 5/1983 | Petroff | 367/108 |
| 4,439,846 | 3/1984 | Rodriguez | 367/99 |
| 4,459,689 | 7/1984 | Biber | 367/112 |
| 4,574,368 | 3/1986 | Lipschutz | 367/108 |
| 4,578,997 | 4/1986 | Soltz | 367/908 |

FOREIGN PATENT DOCUMENTS 1935319 7/1969 Fed. Rep. of Germany .
2755556 12/1977 Fed. Rep. of Germany .
81/02472 9/1981 PCT Int'l Appl. .

Primary Examiner—Thomas H. Tarcza
Assistant Examiner—Daniel T. Pihulic
Attorney, Agent, or Firm—Abelman Frayne Rezac & Schwab

[57] ABSTRACT

Apparatus for sensing distances in air by transmitting an ultrasonic pulse and measuring the time for return of an echo from a target object is characterized by ability to measure distances to multiple target objects. Preferably the apparatus defaults by displaying the distance to the nearest target but is provided with a push button which when pressed once causes display of the distance to the next target further away, when pressed again causes display of distance to a target after that and so forth. This novel function may be accomplished by discrete logic components or using a microprocessor.

16 Claims, 4 Drawing Figures

DISTANCE SENSING APPARATUS

FIELD AND BACKGROUND OF THE INVENTION

This invention relates to the sensing of distances in air, by means of ultrasound (or possibly audible sound) which is transmitted as a pulse from a distance sensing device and reflected back to it by an object such as a wall, serving as a target at a distance from the device. The time from transmission of the pulse to receipt of its echo is measured, and provides an indication of the distance. Equipment for this purpose is already known, for example, the Sonarange device made by Freedom Engineering Limited, the apparatus described in U.K. patent specification No. 2 082 325A of Sonic Tape PLC, and that described in German OLS No. 2 755 556A of Dieter Haffer.

In general the device will be used to measure distances. One particular application of such devices is for building surveyors and estate agents, measuring the rooms within a building.

At least some known apparatus is constructed so that it largely does not respond to echoes from off the centre line of the transmitted pulse. Nevertheless circumstances arise where a user cannot be sure which of possible target surfaces is giving the echo to which the apparatus responds. For example it may be difficult to be sure that the apparatus is measuring the distance to a wall, rather than to a table standing in front of the wall.

SUMMARY OF THE INVENTION

We have realised that it would be desirable to provide a facility enabling the apparatus to respond to one, or possibly any of several, echoes received after the first echo to which it is capable of responding, and enabling the user to select among the plurality of echoes.

Such a facility could for example enable a user to ignore an unwanted echo, and make use of a desired echo returning from further away. The facility could for example be employed to measure the distance to an object (say a wall) followed by measurement of a greater distance, such as through a doorway in the wall to another wall beyond.

While the invention is principally conceived for use where distances are measured, it could conceivably be applied in circumstances where there is no measurement read out. One example would be devices which sense whether the distance to a reflecting object is between a pair of prescribed limits, or is above or below a prescribed limit value. Another example would be devices which are directly coupled to give automatic actuation of something else, such as a camera rangefinder automatically coupled to the focus adjustment.

According to one aspect of the present invention there is provided apparatus for sensing distances in air, comprising means to transmit at least one ultrasonic or sonic signal, means to detect receipt of an echo and means to measure or otherwise sense the time elapsed from transmission to return of the echo characterised in that the apparatus possesses ability to detect a subsequent echo and measure or otherwise sense the time from transmission to return thereof, as well as possessing ability to detect a first echo and measure or otherwise sense the time from transmission to return of the first echo.

This invention can be implemented in various ways. One possibility is that the apparatus detects the first echo and at least one subsequent echo, measures or senses the respective times from transmission to return of each one of the detected echoes, and then offers a plurality of measured or sensed values for inspection by a user. For instance, a plurality of measured times could be converted to respective measurements of distance and then the apparatus might display to a user the distance of the target returning the first echo, the distance of the target returning any second echo and perhaps the distances of any targets returning subsequent echoes, up to a maximum range. These might be displayed simultaneously on an appropriate display or they might be displayed in succession on a display suitable for displaying only one such distance at a time. In either case the user could then pick out whichever value(s) appeared to be the distance(s) he was attempting to measure.

An alternative approach, which is preferred, is that the apparatus includes selectively operable control means to choose between successive echoes returning from different distances, or to choose between respective values associated with such successive echoes. According to a second aspect of this invention there is provided apparatus for sensing distances in air, comprising means to transmit at least one ultrasonic or sonic signal, means to detect receipt of at least one echo and time sensing means to measure or otherwise sense the time elapsed from transmission to return of the echo, characterised by selectively operable control means to choose between echoes from different distances and cause the apparatus to measure or otherwise sense the time elapsed from transmission to return of the chosen echo, or to choose between measured or sensed values respectively associated with echoes from different distances.

For all forms of this invention the transmitted signal preferably consists of one, or possibly a succession of pulses of sound or ultrasound, each pulse containing a number of cycles of the transmitted frequency or frequencies. Such a pulse might also be termed a "burst".

It is not essential that the apparatus should be able to detect more than one echo from the same transmitted pulse. Conceivably a transmitted pulse or a succession of transmitted pulses might be employed for detecting one echo, and thereafter a further transmitted pulse or succession of pulses employed to detect a different echo from further away while the detecting means is inhibited from detecting echoes until time for return of the first echo has passed. This further transmission should of course take place while the apparatus and the target(s) remain in the same positions.

Preferably the means to sense the elapsed time produces a numerical measured value, and means are provided to display a digital distance measurement derived from the measured value. If the apparatus includes the selectively operable control means mentioned above, these can cause the apparatus to display a distance measurement derived from the time from transmission to return of the chosen echo.

An alternative to numerical measurement, however, is that the means to sense the elapsed time functions to sense only whether the time is above or below a certain limit value, or is between a pair of limit values, without creating a numerical measurement of the time.

At its simplest, apparatus embodying this invention may only be able to respond to first and second echoes. However, it is preferably able to respond to a greater plurality of echoes.

Selectively operable control means may have multiple settings, for selecting between echoes from more than two different distances. Alternatively such control means may have a single action and be operable repeatedly to increment through echoes from different distances. For example it might be operated once to choose the second echo, operated again to choose the third echo and so on. Such control means may take the form of a push button. The apparatus will generally only respond to echoes of at least a qualifying amplitude. That amplitude or the amount of prior amplification of electrical signals derived from returning echoes may vary to compensate for the weakening of an echo with distance travelled.

When the apparatus includes selectively operable control means, the apparatus is preferably arranged to default by treating the first echo which is above a qualifying amplitude and from beyond a minimum range as the chosen one, unless the selectively operable control means has been operated.

The apparatus may detect all echoes of a single transmitted signal, provided these have at least a qualifying amplitude, and return from sufficiently different distances between maximum and minimum limits. Selectively operable control means can then act to choose between the electrical signals derived from each of these echoes.

It is then convenient that the time sensing means should ignore each echo before the chosen one. For this the apparatus may include means to count a variable number (n) of echoes which are above a qualifying amplitude, while continuing time measurement. Conveniently the last of these echoes will bring about an enabling of the time sensing means to respond to the subsequent said signal, which will be that associated with the chosen echo. With such an arrangement the selectively operable control means may take the form of a push button, each press on which acts to increment the variable number (n) of echo signals which are counted and passed over before the chosen echo is received.

As an alternative to detecting and counting "unwanted" echoes before the chosen echo, the apparatus might be arranged to store the time from transmission to return of the last "unwanted" echo, and then for a subsequent transmission ignore any and all echoes until the stored time had elapsed. The next following echo having more than a qualifying amplitude would be detected as the chosen echo. Once again the selectively operable means could take the form of a push button. Pressing it would step on to the next echo, by treating the most recently measured time to a chosen echo (or an average from several repeated measurements) as the time during which all echoes are ignored. Of course it would need to be ensured that the later part of the last "unwanted" echo was ignored, as well as its beginning.

The apparatus may be arranged to transmit repeated pulses automatically, to detect receipt of an echo corresponding to each pulse transmitted, and to maintain a display of a distance measurement which might be derived from an echo of the most recent pulse transmitted, or might be an average of values from echoes of several pulses. In either event, it is suitable for the selectively operable control means to cause the apparatus to pass over a selected number of echoes from each transmitted pulse before the chosen echo is received, as mentioned above.

A particularly preferred form of the apparatus includes a number of the above features. It has selectively operable control means to choose between successive echoes from different distances, and cause the apparatus to measure or otherwise sense the time elapsed from transmission to return of the chosen echo: if the control means is not operated, the first echo of qualifying amplitude is chosen; if the means is operated once both the first echo and any second echo of qualifying amplitude are detected, but the apparatus measures or otherwise senses the time elapsed from transmission to return of the second echo; if the means is operated again the first, and second and any third echoes of qualifying amplitude are detected but the apparatus measures or otherwise senses the time elapsed from transmission to return of the third echo; and so on.

DESCRIPTION OF PREFERRED EMBODIMENTS

Figure 1:
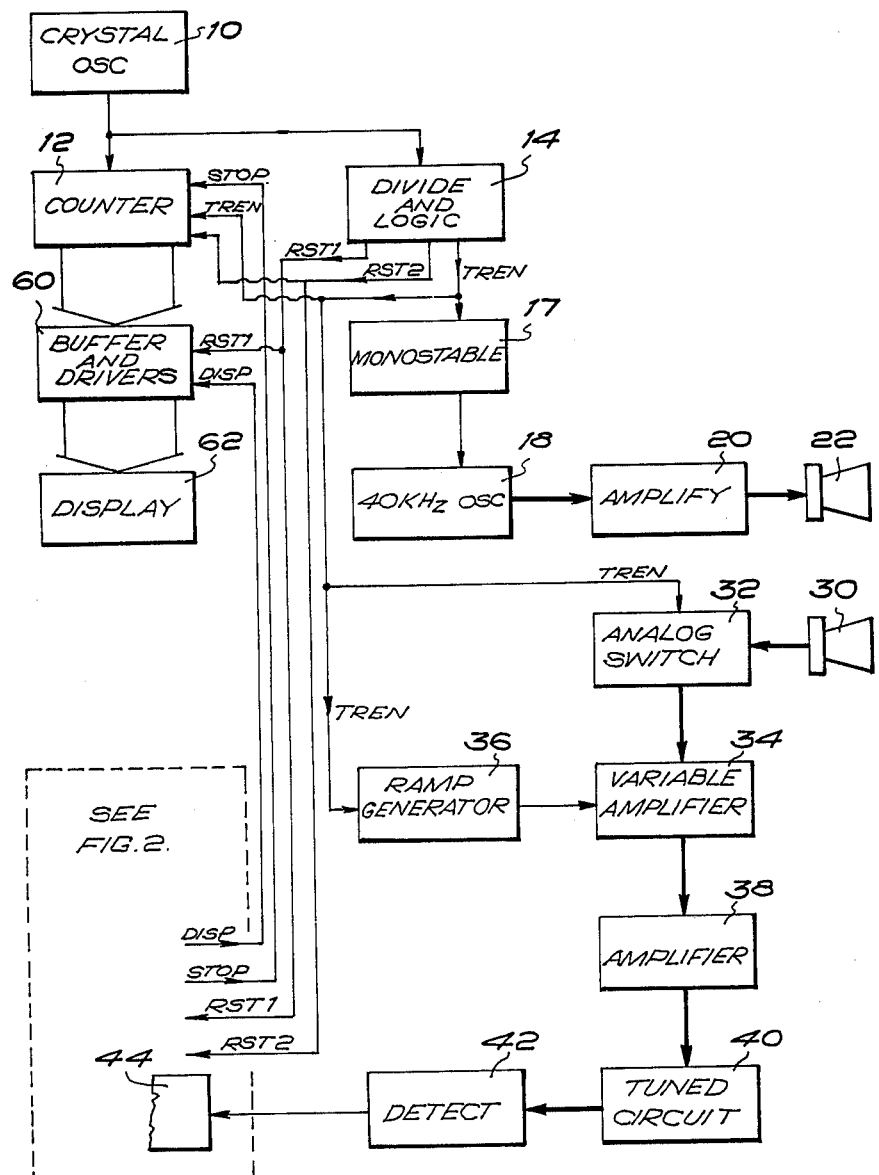
FIG. 1 is a block diagram schematically indicating the circuitry of a first form of distance measuring device, employing logic circuitry.

As shown by FIG. 1 the output of a crystal oscillator running at somewhat over 100 KHz is fed to a decades counter 12, and to a dividing and logic circuit 14. This divides the oscillator signal and at intervals of about 200 m sec. produces three short output pulses in succession, hereinafter designated RST1, RST2 and TREN. They appear in that order on respective outputs, at intervals of, say, 1 m sec.

The TREN pulse triggers a monostable 17 to produce a pulse which enables a 40 KHz oscillator 18 for approximately 0.6 m sec, so that it generates a 40 KHz pulse of that length, approximately twenty four cycles. The 40 KHz pulse is amplified at 20 and supplied to an output transducer 22 which transmits it as an ultrasonic pulse.

Any echo is received by transducer 30. The echo signal passes through a circut 32 functioning as an analog switch. This circuit is inhibited by TREN, and it contains an RC network which extends the period of inhibition so that no echo can pass during a period from the start of transmission to slightly after the end of transmission. This eliminates spurious echoes by suppressing all echoes from within a minimum range of approximately 45 cm.

From the analog switch circuit 32 the echo signal (s) pass onto a variable amplifying circuit 34.

A ramp generator 36 is initiated by the TREN pulse to produce a progressively rising output. This controls the amount of amplication given by the circuit 34, so that this also rises progressively with time elapsed since the ultrasonic pulse was transmitted. This rising amplification approximately compensates for the attenuation of the ultrasonic pulse with travel through air. By virtue of this, all true echoes returning from along the centre axis of the transmitted beam are amplified to an approximately similar signal amplitude, and can be distinguished from weaker, spurious echoes, e.g. reflected by objects which lie off the central axis of the transmitted beam. This expedient is known per se and described in U.K. Pat. No. 2082325A mentioned above.

The amplification by the variable amplification stage 34 could be less than unity, and it would also be feasible to employ a variable attenuator here with attenuation reducing progressively with time following transmission of an ultrasonic pulse.

From the variable amplification stage 34 the echo signals are fed to further stages of amplification 38, a tuned circuit 40 to filter out any spurious received signals of the wrong frequency, and then a detector stage 42. This delivers an output signal if an echo signal which has passed through the preceding stages is above a predetermined minimum amplitude, and accordingly is recognised as a genuine echo from a target object along the centre axis of the transmitted pulse.

When an ultrasound pulse is transmitted, the leading edge of the TREN pulse starts the counter 12 for the crystal oscillator clock signals.

Each transmitted pulse may give rise to several echoes from different target surfaces approximately along the centre axis of the transmitted beam. These echoes will lead to echo signals of sufficient amplitude to pass the detector stage 42. In accordance with this invention one of these echo signals is chosen and converted to a signal (designated STOP) which stops the counter 12. This function is performed by the logic circuitry shown in FIG. 2.

The echo signals from the detector stage 42 are fed to trigger a monostable 44. For each echo signal passed by the detector stage 42, the monostable 44 gives one and only one voltage pulse which is fed to the clock input of a D-type flip-flop 46 and to the clock input of a presettable down counter 48.

The four outputs of the counter 48 are connected to a 4-input NOR gate 49 whose output is the input to the flip-flop 46. In the default state, the output of counter 48 is zero so the input to the flip-flop 46 is high. The leading edge of the first echo pulse from the monostable 44 clocks the flip-flop 46 to give a logic high signal on the Q output of the flip-flop 46. This output (designated STOP) is connected to stop the counter 12. Thus its count when stopped represents the time from transmission of the ultrasonic pulse to receipt of the first echo above the qualifying minimum amplitude set by the detector stage 42.

Figure 2:
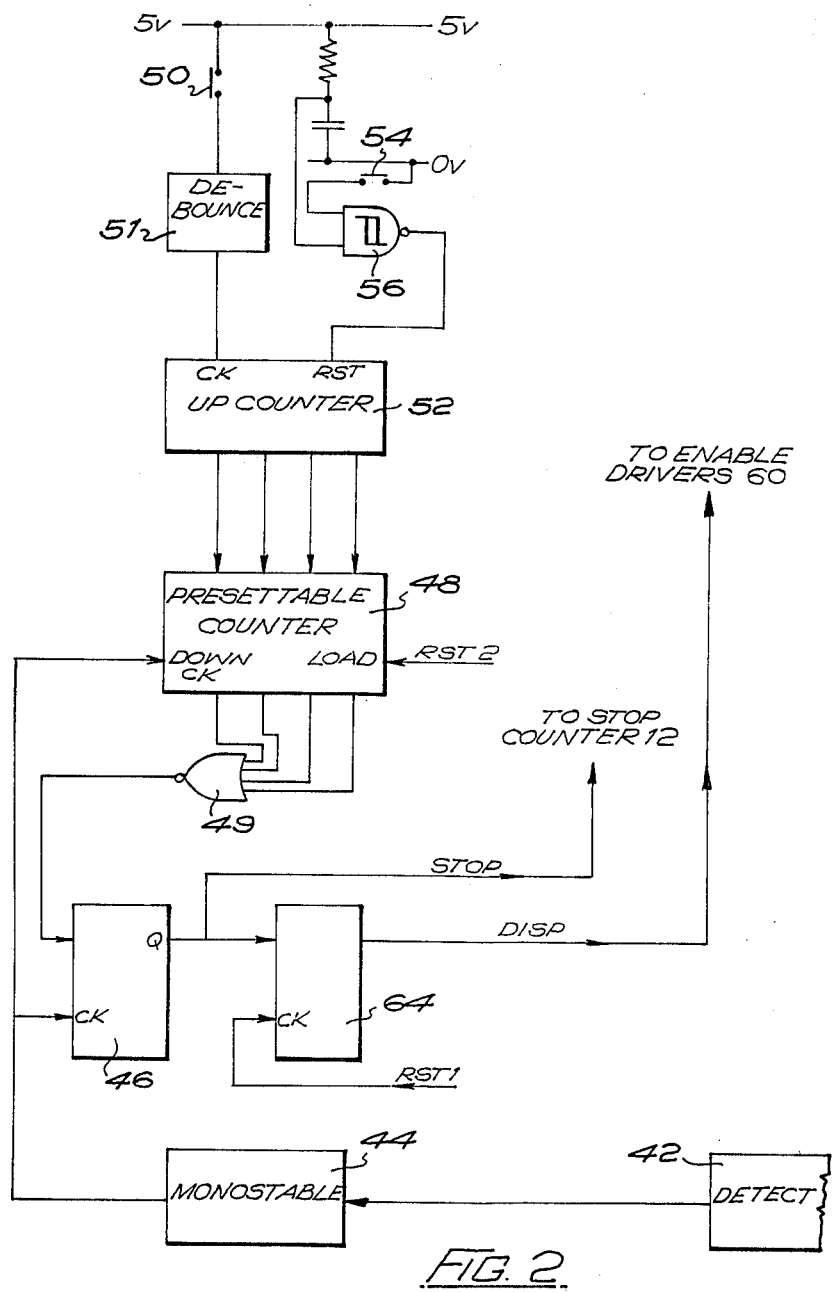
FIG. 2 shows circuitry to select a desired echo.

As shown by FIG. 2 the device has a push button 50 (the "NEXT" button) connected through a debouncing circuit 51 to the clock input of an up counter 52. The device also has a push button 54 for clearing the effect of the next button. This is connected, via a Schmitt trigger 56, to the reset input of the counter 52.

The outputs of the up counter 52 are connected to parallel load inputs of the presettable counter 48. The "load" input of the counter 48 is connected to RST2 from the divide and logic circuit 14. So, every RST2 pulse presets the counter 48 to the output of up counter 52.

For as long as the NEXT button 50 is not pressed the output of counter 52 is zero, and counter 48 is set to zero by each RST2 pulse. This is the default condition and the first echo appears as a logic high on the Q output from flip-flop 46 which is the STOP pulse to stop the clock.

If the NEXT button 50 is pressed once, the counter 52 will output a one, and each RST2 pulse will set counter 48 to one. The input to flip-flop 46 will then be low so that when the leading edge of the first echo pulse clocks the flip-flop 46, its Q output stays low and the counter 12 continues to count. However, the leading edge of the first echo pulse will decrement the counter 48 to zero. Then the second echo pulse from the same transmitted pulse will give a high Q output, as STOP to the counter 12.

If the NEXT button 50 is pushed more than once (n times) each push will increment the counter 48 to a higher output (n) provided the counter does not go past its maximum count. Then the first (n) echo pulses from each transmitted pulse will progressively decrement the counter 52 to zero, whereafter the following echo pulse (the n+1'th) will give a STOP output from flip-flop 46 to stop the counter 12.

The effects of pressing the NEXT button 50 once, or more times, are annulled by pressing the button 54 which resets the counter 48 to zero. The counter 48 is also set to zero when the device is turned on, by virtue of the resistor and capacitor network 57 connected to the Schmitt trigger 56 to take the reset input of up counter 52 high initially. (The button 54 could be dispensed with and the effect of the NEXT button 50 cleared simply by turning off the device at the end of a measurement).

When the counter 12 stops, the count recorded in it is directly proportional to the distance from the device to the target object which returned the chosen echo.

The next RST1 pulse strobes this count into a buffer and display driver 60 which displays it on a seven segment display 62. The next RST2 pulse resets the counter 12. Hence the display 62 shows the latest distance measurement made. As is known per se the frequency of the oscillator 10 may be chosen so that the count from counter 12 which is displayed on the display 62 is a direct measurement in meters, or alternatively in feet, from the device to the target which returned the chosen echo. As is also conventional the frequency of oscillator 10 may be adjusted automatically to compensate for variations in temperature and hence variations of the speed of sound in air.

It might happen that no chosen echo is received before the next ultrasonic pulse is transmitted. To deal with this possibility the Q output of flip-flop 46 goes to the input of a D-type flip flop 64 which is clocked by RST1 to yield an output (designated DISP) which enables the display driver 60. If no chosen echo is received the Q output from flip-flop 46 stays low, (i.e. STOP does not appear) and there is no DISP output from the flip-flop 64 to enable the display driver 60. Consequently the display 62 is blank.

Figure 3:
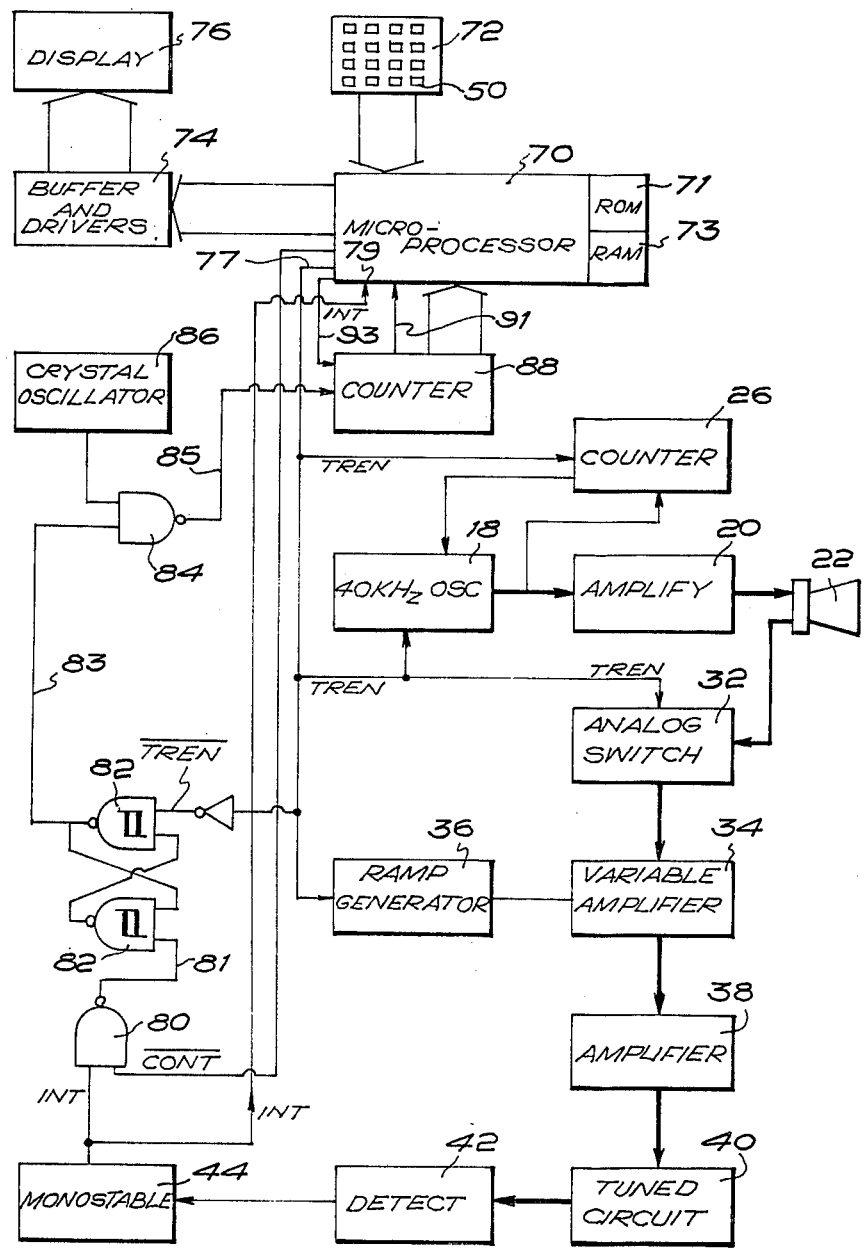
FIG. 3 is a schematic block diagram of a second embodiment of distance measuring device, employing a microprocessor.

Referring now to FIG. 3, a microprocessor 70 has parallel input and output ports, and is provided with read-only and random access memory 71, 73. It is connected to a key pad 72, and to drivers 74 for a seven-segment display 76. This is all conventional, and the microprocessor repeatedly scans the key board 72, as is also conventional. One key on the board 72 is dedicated as a "NEXT" button.

When a measurement is being made the operating program of the microprocessor 70 causes it to generate a short pulse (TREN) on one line 77 of an output port. The TREN pulse enables a 40 KHz oscillator 18 whose output signal is amplified at 20 and supplied to an output transducer 22. The 40 KHz signal is also fed to a counter 26 which counts the transmitted cycles until twenty four cycles have been generated, whereupon the counter 26 inhibits the 40 KHz oscillator, terminating the transmitted ultrasonic pulse and holding the oscillator 18 inhibited until the next TREN pulse. The counter 26 should of course be reset between TREN pulses.

The transducer 22 is also used for reception of echoes. The received echo signals are supplied to an analog switch circuit 32 just as in FIG. 1. The input to this analog switch circuit is connected across a pair of diodes in parallel opposition, which are in series with the transducer 22.

The feature of a counter 26 to fix the length of a transmitted pulse and/or the feature of a single transducer 22 could be employed in the embodiment of FIG. 1. Conversely a monostable 17 could be used to fix the transmitted pulse length in this embodiment and/or a separate receiving transducer 30 could be employed here as in FIG. 1.

The received echo signals are amplified and detected as in the embodiment of FIG. 1. Again any echo signals passed by the detector stage 42 trigger a monostable 44 so as again to give a single voltage pulse (designated INT) for each echo.

The INT pulses from the monostable 44 are used in two ways. Each one is fed to an interrupt request input 79 of the microprocessor. Secondly they are fed to one input of a NAND gate 80. The output from this passes along line 81 to one input of a flip-flop consisting of a pair of NAND Schmitt triggers 82. The other input to this flip-flop receives an inversion of the TREN pulses ($\overline{\text{TREN}}$).

One output of the Schmitt trigger 82 is connected via line 83 to a NAND gate 84. A crystal oscillator 86 supplies clock pulses via the gate 84 and line 85 to a binary counter 88. The output of this is connected to a parallel input port of the microprocessor 70. In use the microprocessor generates an active low signal (designated $\overline{\text{CONT}}$) on one line of a parallel output port. This is connected to the other input of the gate 80.

TREN causes transmission of an ultrasonic pulse as described in connection with FIG. 1. When it does this there will necessarily be no INT signal and so the line 81 is necessarily high. As TREN goes high, $\overline{\text{TREN}}$ goes low driving line 83 high, and hence allowing the crystal oscillator pulses to pass through the gate 84 to the counter 88. In this way TREN starts the count. When the TREN pulse finishes, $\overline{\text{TREN}}$ reverts to a high state but this does not change the state of the flip-flop formed by the Schmitt triggers 82.

If the NEXT button has not been pressed, the microprocessor keeps $\overline{\text{CONT}}$ high and when the first echo signal is passed by the detector stage 42 the INT pulse from the monostable 44 interrupts the microprocessor and also sends line 81 and hence line 83 low. Consequently the crystal oscillator pulses can no longer pass through the gate 84 to the counter. In this way the pulse from the monostable 44 stops the count virtually immediately. Moreover, the short delay arising from the propagation delays of the gates 80, 82 and 84 is always the same. The microprocessor 70 reads the (stopped) count in the course of servicing the interrupt from monostable 44. However, it will be appreciated that the interrupt servicing routine is not itself being relied upon to stop the count.

If the NEXT button is pressed once, the program of the microprocessor causes it to maintain $\overline{\text{CONT}}$ low. $\overline{\text{CONT}}$ may go low before, during or after the TREN pulse: this does not matter provided $\overline{\text{CONT}}$ is low before the earliest possible receipt of an echo.

When the first echo is received and generates a pulse from the monostable 44, the low state of $\overline{\text{CONT}}$ maintains line 81 high, and line 83 stays high regardless of the INT signal. Consequently the counting of crystal oscillator pulses is not affected by the first echo. However, in servicing the interrupt from the first echo the microprocessor sends $\overline{\text{CONT}}$ high *after* INT has reverted to a low state. Because of this INT from the second echo is able to stop the clock in the manner described above.

The operating program of the microprocessor can allow the NEXT button to be pressed a plurality of times (n times) to pass over the first n echo signals which pass the detector stage 42. The microprocessor then counts the interrupts received from the monostable 44 and in servicing the n'th interrupt it sends $\overline{\text{CONT}}$ high. Thus the first n echoes do not stop the count of crystal oscillator pulses but the following (i.e. the n+1'th) echo does stop the count.

By way of example, if the NEXT button has been pressed twice so that the third echo is the chosen one, the sequence of signal changes is set out in the following table:

TABLE 1

| Change | Consequence/State of other signals | | |
|---|---|---|---|
| TREN ↑ | INT is low, 81 is high, $\overline{\text{TREN}}$ ↓ 83 ↑ | | Count starts |
| TREN ↓ | $\overline{\text{TREN}}$ ↑ no other change | | |
| First echo | | | |
| INT ↑ | $\overline{\text{CONT}}$ is low, holds 81 high | | Count continues |
| INT ↓ | no change | | |
| Second echo | | | |
| INT ↑ | $\overline{\text{CONT}}$ is low, holds 81 high | | Count continues |
| INT ↓ | no change | | |
| $\overline{\text{CONT}}$ ↑ | INT is low, holds 81 high | | |
| Third echo | | | |
| INT ↑ | 81 ↓ 83 ↓ | | Count stops. |
| Microprocessor reads stopped count. | | | |

When the microprocessor services the interrupt from the chosen echo it reads the (stopped) count from the counter 12 and from it calculates the distance from the measuring device to the target object which reflected the chosen echo. The distance may be displayed on the seven segment display, or may be used by the microprocessor for further calculation.

The device preferably includes means enabling the microprocessor to read in a digital measurement of temperature, so that it can allow for the ambient temperature in calculating the distance to the target object.

Whether or not the chosen echo is received, the microprocessor must reset the counter 88 before the next TREN pulse. This is done by a pulse on line 93 which is another line of an output port.

In the embodiment of FIG. 3, it is arranged that, in the absence of the chosen echo, the counter will reach its maximum count, and overflow, before the next TREN pulse. The resulting carry signal from the counter on line 91 is used as an interrupt of higher priority. In servicing either this interrupt or an interrupt by the chosen echo, the microprocessor resets the counter. The TREN pulses may be generated at regularly spaced intervals, or may follow the chosen echo, or counter overflow, whichever happens first.

If the NEXT button is used, the microprocessor takes $\overline{\text{CONT}}$ low during the appropriate number of interrupts after every TREN pulse, until either the effect of the NEXT button is cleared, or until the NEXT button is pressed again to increase the number of echoes which are passed over before the chosen echo. The effect of the NEXT button can be cancelled by switching the device off and on again, or by means of a CLEAR button on the keypad 72.

The details of an operating program for the microprocessor will depend on the particular microprocessor employed, but functions which it must provide are indicated above, viz to generate the TREN pulses, service the interrupts, provide and remove the $\overline{\text{CONT}}$ signals, read and reset the counter 88, and manipulate the count so read in.

The crystal oscillator 86 preferably runs at 1 MHz. However, a lower frequency might be employed, for example if it provided impractical to count such a high frequency.

It is by no means essential, but it is possible that the pulses from crystal oscillator 86 (especially if a 1 MHz signal) could provide the clock signal for the microprocessor. The counter 88, and/or the display drivers 74 could possibly be incorporated on the same chip (or at any rate within the same integrated circuit encapsulation) as the microprocessor and its memory. If a microprocessor was employed which did not have parallel input and output ports, a separate parallel input/output chip would be used to provide these, as is conventional.

As described above in both FIG. 1 and FIG. 3 variable amplification is achieved with a ramp generator 36 governing a variable amplifier 34. An alternative, giving improved match between the variable amplification and the distance travelled by the returning echo, utilises the circuit shown in FIG. 4.

Figure 4:
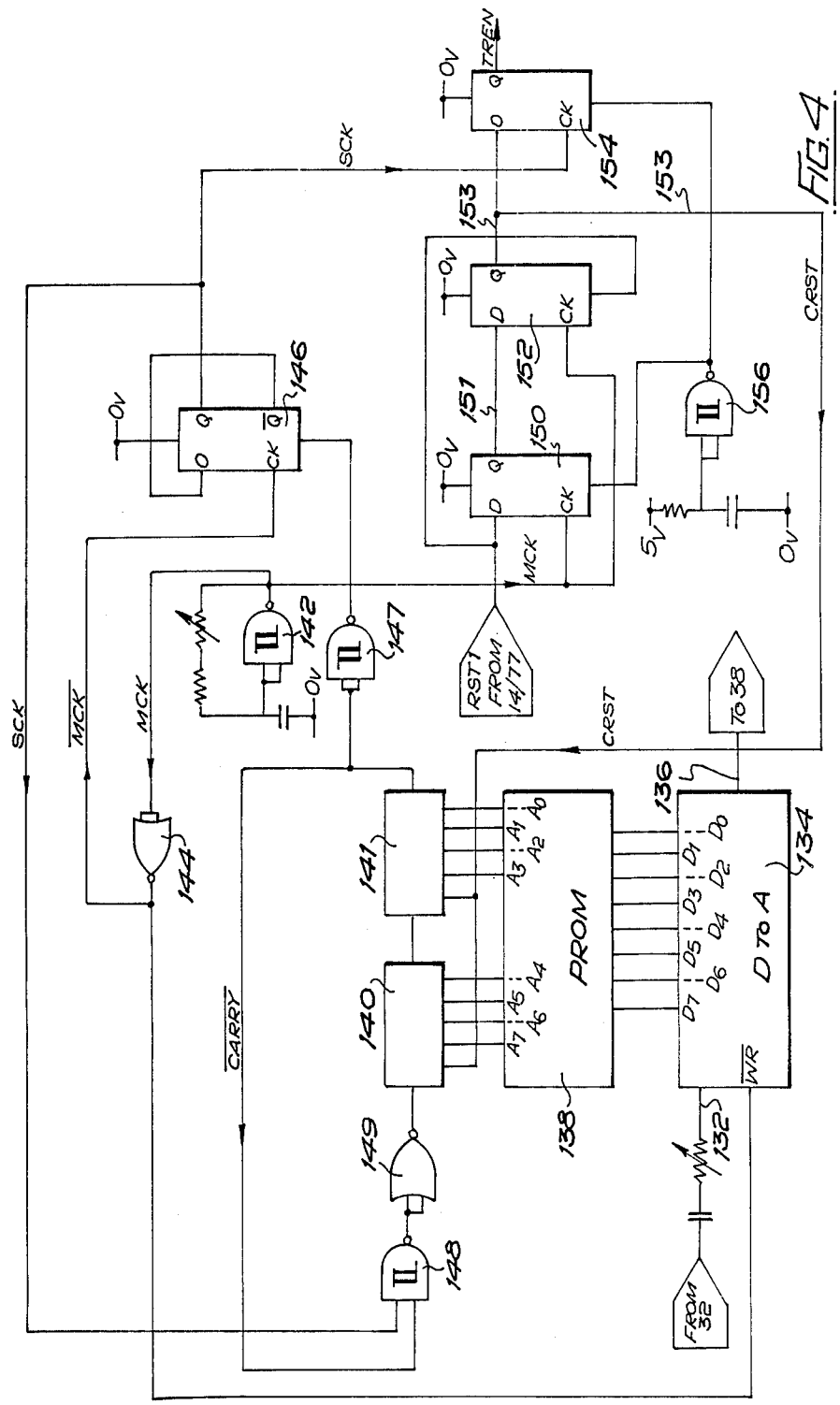
FIG. 4 is a circuit diagram for a modification.

This circuit of FIG. 4 would be substituted for the ramp generator 36 and variable amplifier 34 of FIG. 1 or FIG. 3.

This circuit receives as an input the echo signals from analog switch 32, and delivers an output to the further amplifier stages 38. If used in FIG. 1 the circuit performs at least part of the logic function of stage 14, because it receives RST1 as an input and generates TREN. If used in FIG. 3, the microprocessor's output on line 77 is not used as TREN, but as RST1. The circuit of FIG. 4 then generates TREN from this.

Operation of this circuit is as follows:

The echo signal(s) from analog switch 32 are input at 132 to a digital-to-analog converter 134, and output on line 136 as a fraction of the input signal. That fraction is governed by eight bits of digital data supplied from a preprogrammed, programmable read-only memory 138. An eight bit address is applied to memory 138 from two four bit binary counters 140, 141 connected so that the carry output of counter 140 is the input to counter 141.

After an ultrasonic pulse is transmitted the counter 140 is incremented regularly, so that the address in PROM 138 is incremented. The data stored in the PROM is such that the amplification of the echo signal(s) in the digital-to-analog converter increases with time elapsed since transmission of the ultrasonic pulse. The increase with time follows a curve experimentally determined with the same types of transducer 22, 30 (and found to increase approximately with the square of distance as predicted by theory). This curve is such that the amplification exactly compensates for the attenuation in air of ultrasound pulses and their echoes from the centre axis of the transmitted ultrasound pulse. Consequently after this variable amplification stage, all echoes from within a given range along the centre axis have approximately equal magnitude (enabling the device to discriminate against weaker spurious echoes).

The binary counters 140, 141 are reset to zero by a signal CRST just after the trailing edge of an RST1 signal and they are then incremented until there is overflow from the higher order counter 141 generating as active low signal ($\overline{\text{CARRY}}$) as will be explained below.

A Schmitt trigger 142 with an RC network generates a clock signal (hereinafter MCK) of around 4 KHz. This is inverted at 144 to a signal $\overline{\text{MCK}}$ which is divided by flip-flop 146 to give a 2 KHz secondary clock signal SCK. MCK and $\overline{\text{MCK}}$ are continuous square waves. However, SCK does not run continuously, because $\overline{\text{CARRY}}$ is inverted at 147 to give CARRY which is fed to the clear input of flip-flop 146, controlling the generation of the SCK signal. Thus SCK starts when the counters 140, 141 reset.

The SCK signal is shaped by Schmitt trigger 148, inverted at 149 and input to the binary counter 140. Counting continues until $\overline{\text{CARRY}}$ appears as the output from 141. This is fed to the second input of Schmitt trigger 148, stopping further incrementing of the counters 140, 141. It also stops generation of SCK. The counters remain in this condition, providing address zero to the PROM 138, until the next RST1 signal generates CRST which causes a reset of the counters 140, 141 and hence causes $\overline{\text{CARRY}}$ to disappear.

Because the counters 140, 141 stop on address zero as the count following the highest binary address 1111 1111 (hexadecimal address FF), the data held by PROM 138 at these addresses 00 and FF corresponds to the final and penultimate points on the experimental amplification curve respectively and is substantially equal.

The "chip-select" inputs of the digital-to-analog converter 134 and of the PROM 138 are held enabled. The inverted clock signal $\overline{\text{MCK}}$ is fed to an inverting "write enable" input $\overline{\text{WR}}$ of the digital-to-analog converter.

The generation of the CRST and TREN signals is as follows. RST1 is fed to the D input of flip-flop 150 and to the clear input of flip-flop 152 where it forces the line 153 low.

The MCK signal strobes RST1 signal into flip-flop 150 to send line 151 high. After the trailing edge of RST1 the next leading edge of MCK strobes the high on line 151 into flip-flop 152, providing a high pulse (CRST) on line 153 for one cycle of MCK, this resets counters 140, 141, and hence starts generation of SCK as explained above.

The first leading edge of SCK strobes the CRST signal into flip-flop 154, from which it is output as the TREN signal.

The Schmitt trigger 156 with resistor and capacitor connected to it forces the clear inputs of flip-flops 150 and 154 high for a short time when power is first supplied, so that the line 151 and the TREN lines are initially set into a low state, and spurious signals on them are avoided.

If the circuit of FIG. 4 is substituted in FIG. 1, the CRST signal can be used as RST2 if desired.

By way of example, the following Table sets out the sequence of signal states and changes from one RST1 pulse to the next.

TABLE 2

| EVENT | CONSEQUENCE/STATE OF OTHER SIGNALS | ADDRESS (Hexadecimal) |
|---|---|---|
| | $\overline{\text{CARRY}}$, SCK, RESET, TREN, 51 and CRST all low. | 00 |
| RESET ↑ | CRST held low | |
| MCK ↑ | 51 ↑ | 00 |
| 51 stays high, with $\overline{\text{CARRY}}$, SCK, TREN, and CRST low until RESET ↓ | | |
| MCK ↑ | 51 ↓ CRST ↑ $\overline{\text{CARRY}}$ ↑ | 00 |
| MCK ↓ | $\overline{\text{MCK}}$ ↑ SCK ↑ TREN ↑ CRST high | 00 |
| MCK ↑ | CRST ↓ | |
| MCK ↓ | $\overline{\text{MCK}}$ ↑ SCK ↓ | |
| MCK ↑ | | |
| MCK ↓ | $\overline{\text{MCK}}$ ↑ SCK ↑ TREN ↓ | |
| MCK ↑ | SCK increments address | 01 |
| MCK ↓ | $\overline{\text{MCK}}$ ↑ SCK ↓ | |
| MCK ↑ | | |
| MCK ↓ | $\overline{\text{MCK}}$ ↓ SCK ↑ increments address | 02 |
| about four lines repeat until address FF, whereafter MCK ↑ | | |
| MCK ↓ | $\overline{\text{MCK}}$ ↑ SCK ↓ | |
| MCK ↑ | | |
| MCK ↓ | $\overline{\text{MCK}}$ ↑ SCK ↑ increments address | 00 |
| | $\overline{\text{CARRY}}$ ↓ SCK ↓ | |

System has now reverted to top line of table.

With any of the embodiments described above it is envisaged that a user would normally put the device in position to take a measurement. He would operate it for long enough to transmit several ultrasonic pulses, and thereby make sure that the distance measurement appearing on the display was steady. Then if the user wished to measure the distance to a more remote target he would press the NEXT button once, and again operate the device for long enough to be sure that a steady figure was appearing on the display. This same procedure of measuring with several transmitted pulses might be repeated several times in appropriate circumstances, pressing the NEXT button once between each measurement so as to go on to the next echo. Finally the device would be switched off, and carried away.

Various modifications from the described embodiments are possible. One possibility would be for the counter 12 or 88 to be preset each time an ultrasonic pulse was transmitted. The preset count would correspond to a predetermined distance.

The clock signals from the crystal oscillator 10 or 86 would then decrement the counter, and the device would be arranged to indicate whether the chosen echo was or was not received before the counter had decremented to zero. In such an arrangement the exact time for return of the chosen echo is not recorded, but it is sensed as being above or below a prescribed value.

With a microprocessor system, as in FIG. 3, it might be arranged that pressing the NEXT button followed by a figure key would choose an echo determined by the figure. For instance pressing "NEXT" and then "3" might select the third echo.

Another possibility within this invention would be for the apparatus to retain and display the highest distance previously measured if, on pressing the NEXT button, no further echo were detected from within a maximum range. In this event a letter F could also appear on the display to indicate that it was the measurement for the final echo. With this arrangement a user would take a measurement and press the NEXT button repeatedly until the "F" appeared (and the displayed measurement remained constant). He would then know that this was the measurement from the farthest target.

I claim:

1. An apparatus for measuring distances in air, comprising transmitter means to transmit at least one ultrasonic or sonic signal, echo detecting means to detect receipt of an echo of said signal, time sensing means which generates a numerical value proportional to time from transmission to return of an echo, and display means to display a digital distance measurement derived from said numerical value and which is a measure of distance to the target returning the echo, the improvement comprising ability to detect any one of at least two echoes returning in succession from different distances and within a range, and for any one of said echoes to generate a said numerical value and display a said digital distance measurement obtained therefrom, irrespective of the distances within said range from which the echoes return, means for regularly and automatically repeating the transmitted signal at sufficient delay for return of an echo from a maximum range, control means selectively operable to choose between said echoes returning in succession and to cause said time sensing means and display means respectively to generate a said numerical value and display a said digital distance measurement obtained therefrom, said control means being user operable to choose any one of said echoes, irrespective of the distances within said range from which the echoes return.

2. An apparatus for measuring distances in air, comprising transmitter means to transmit at least one ultrasonic or sonic signal, echo detecting means to detect receipt of an echo of said signal, time sensing means which generates a numerical value proportional to time from transmission to return of an echo, and display means to display a digital distance measurement derived from said numerical value and which is a measure of distance to the target returning the echo, the improvement comprising ability to detect any one of at least two echoes returning in succession from different distances and within a range, and for any one of said echoes to generate a said numerical value and display a said digital distance measurement obtained therefrom, irrespective of the distances within said range from which the echoes return, and control means selectively operable to choose between said echoes returning in succession and to cause said time sensing means and display means respectively to generate a said numerical value and display a said numerical distance measurement obtained therefrom, said control means being user operable to choose any one of said echoes, irrespective of the distances within said range from which the echoes return.

3. Apparatus according to claim 2 wherein said time sensing means act to determine a said numerical value associated with each of said echoes, and said control means are selectively operable to choose between said numerical values.

4. Apparatus according to claim 2 wherein said time sensing means comprises a counter which generates a numerical value proportional to time from transmission to return of an echo, the apparatus comprising means to average a plurality of said values obtained from repeated transmitted signals and echoes thereof.

5. Apparatus according to claim 2 wherein the control means is selectively operable to choose between three or more said echoes.

6. Apparatus according to claim 5 wherein said selectively operable control means is a push-button or a keyboard key having a single action, said control means being operable repeatedly with an incremental action, such that operation while one of said echoes is currently chosen serves to choose the one of said echoes returning from the next greater distance.

7. Apparatus according to claim 2 wherein said means to detect receipt of an echo produces an electrical signal in response to each echo of a single transmitted signal, provided these echoes have sufficient amplitude and return from sufficiently different distances within said range,
said control means being operable to choose between the said signals produced and cause said time sensing means to generate a said numerical value for the said echo chosen by operation of said control means.

8. Apparatus according to claim 7 wherein, when the chosen echo is other than the first one of the said echoes of a transmitted signal, the said signal corresponding to the echo preceding the chosen echo enables response by the time sensing means to the subsequent said signal corresponding to the chosen echo.

9. Apparatus according to claim 8 wherein said time sensing means comprises a counter for clock pulses, and said apparatus includes circuit means for transmitting said signal corresponding to the chosen echo to stop said counter, the said signal corresponding to the preceding echo enabling said circuit means to transmit said signal corresponding to the chosen echo.

10. Apparatus according to claim 7 comprising a microprocessor with an interrupt input, said signals corresponding to echoes being supplied to said interrupt input.

11. Apparatus according to claim 10 wherein said time sensing means comprises a counter for clock pulses, which counter is separate from said microprocessor, said apparatus including circuit means for transmitting said signal corresponding to the chosen echo so as to stop said counter, said microprocessor being controlled by a stored program such that when the chosen echo is other than the first echo, said microprocessor counts interrupts created by each of the said signals corresponding to echoes, and upon interrupt by the signal corresponding to the echo before the chosen echo, enables said circuit means to transmit said signal corresponding to the chosen echo.

12. Apparatus according to claim 2 having a definite state in which the chosen echo is the first echo of sufficient amplitude returning from between minimum and maximum distances, the apparatus going to said definite state when switched on and/or when reset.

13. Apparatus according to claim 2 comprising means for regularly and automatically repeating the transmitted signal after sufficient delay for return of an echo from a maximum range.

14. Apparatus according to claim 13 wherein the apparatus is operable to detect at least one echo of a first transmitted signal, then to pass over any echoes of a subsequent transmitted signal, which echoes return from within the same distance as said at least one echo of the first transmitted signal, and generate a said numerical value for a following echo of said subsequent transmitted signal and display a digital distance measurement derived therefrom.

15. Apparatus according to claim 2 wherein the apparatus is operable to detect at least one of the echoes of a transmitted signal, then to detect a following echo of the same transmitted signal, generate a said numerical value for said following echo and display a digital distance measurement obtained therefrom.

16. Apparatus according to claim 2 possessing ability to detect three or more said echoes returning in succession, and for any one thereof generate a said numerical value and display a said digital distance measurement.

* * * * *